H. J. SHELTON.
SPACING MECHANISM FOR PULVERIZING GRATES.
APPLICATION FILED JAN. 4, 1913.
1,085,638.
Patented Feb. 3, 1914.
2 SHEETS—SHEET 2.
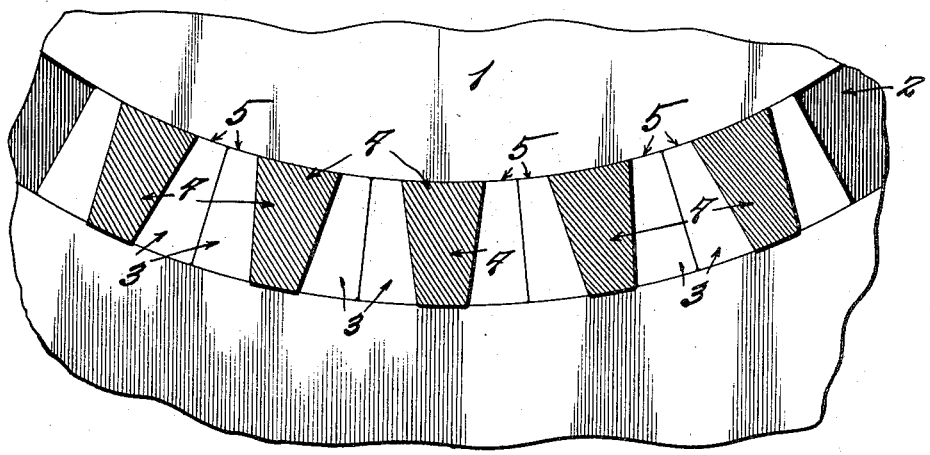
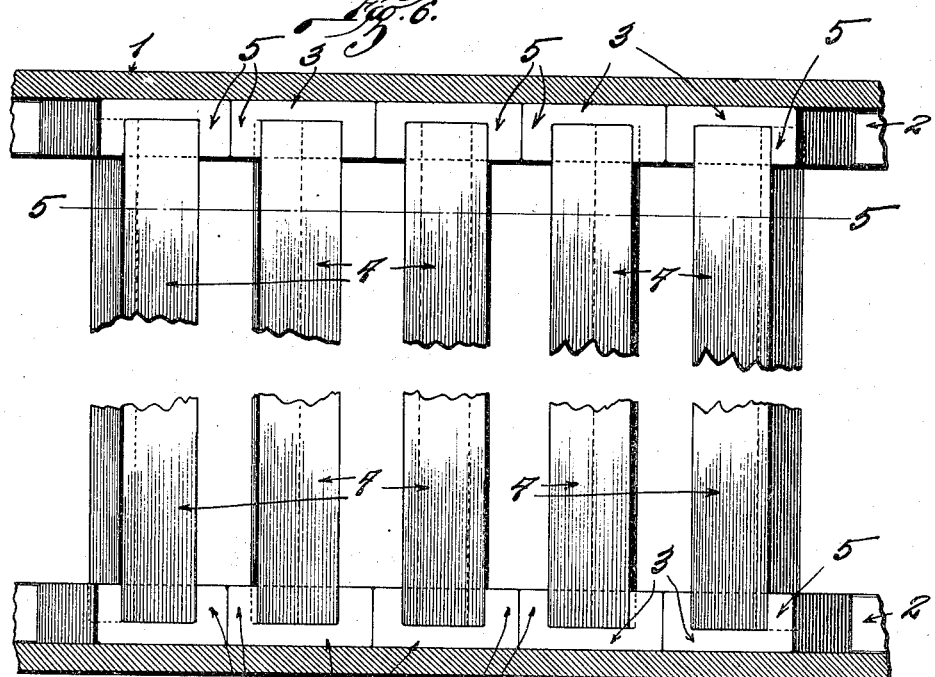

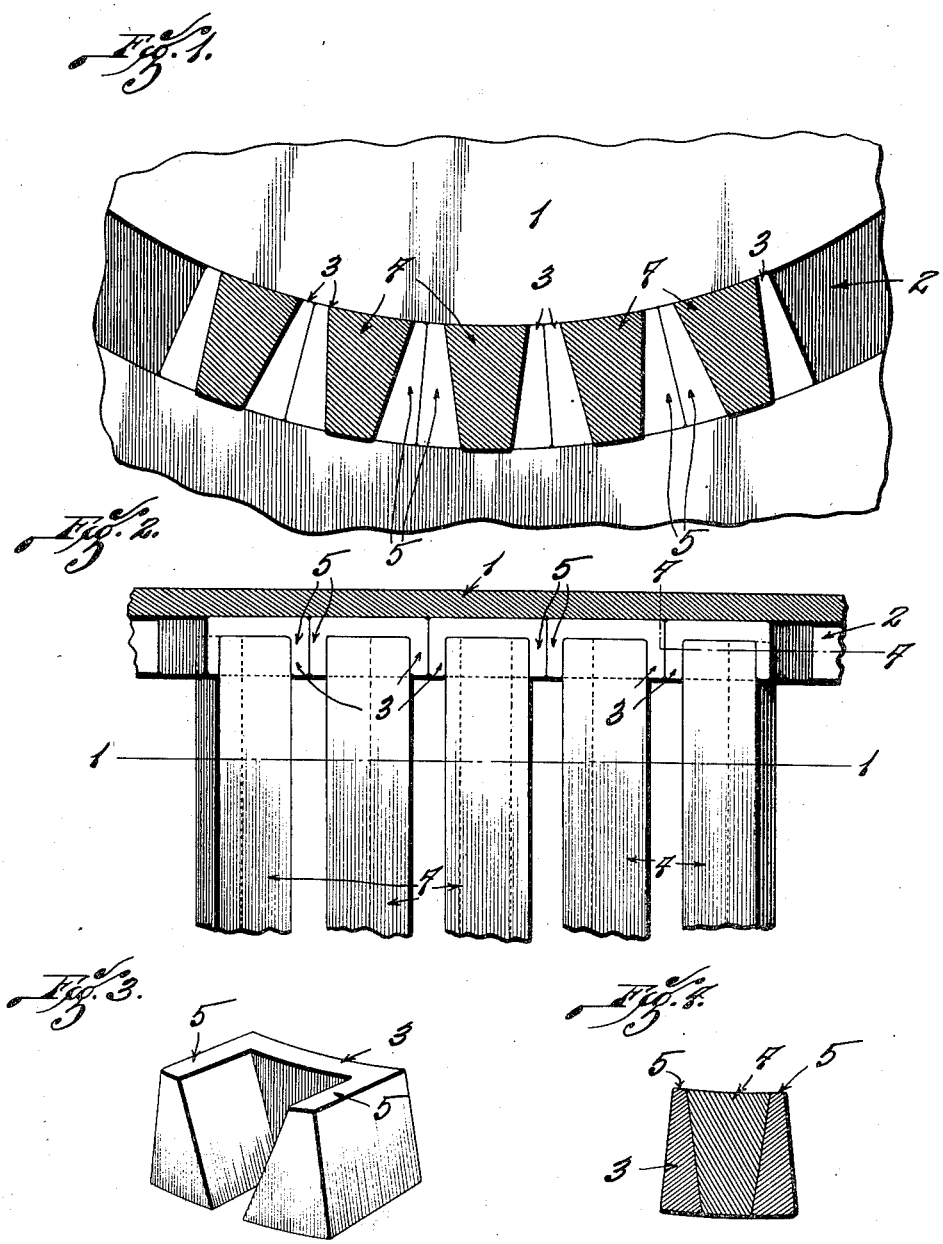

UNITED STATES PATENT OFFICE.

HENRY J. SHELTON, OF ST. LOUIS, MISSOURI.

SPACING MECHANISM FOR PULVERIZING-GRATES.

1,085,638.  Specification of Letters Patent.  Patented Feb. 3, 1914.

Application filed January 4, 1913. Serial No. 740,179.

*To all whom it may concern:*

Be it known that I, HENRY J. SHELTON, a citizen of the United States, and resident of St. Louis, Missouri, have invented certain new and useful Improvements in Spacing Mechanism for Pulverizing-Grates, of which the following is a specification containing a full, clear, and exact description, reference being had to the accompanying drawings, forming a part hereof.

My invention relates to an improved spacing mechanism for pulverizer grates; machines of the class in which material of any of numerous sorts is reduced more or less finely by means of rapidly rotating hammer bars which are caused to repeatedly impinge upon the material as it passes through the machine.

The object of my invention is to provide an improved spacing mechanism for pulverizer grates, whereby the said bars may be spaced nearer to or farther from each other, thereby reducing the material to different grades of fineness.

A further object is to provide a pulverizer with interchangeable grate bar spacing end seats for the purpose just mentioned.

In the drawings: Figure 1 is a sectional side elevation of a portion of a pulverizer cage or grate, the section being taken on the line 1—1 of Fig. 2; Fig. 2 is a sectional plan view of the same; Fig. 3 is a perspective view of one of my improved interchangeable grate bar seats; Fig. 4 is a transverse section taken through one of the grate bars and its seat on the line 4—4 of Fig. 2; Fig. 5 is a view similar to Fig. 1 (the section being taken on the line 5—5 of Fig. 6) showing the grate bars spaced farther apart; and Fig. 6 is a top plan view of a portion of the pulverizer cage shown in Fig. 5.

The numeral 1 indicates the opposite vertical side walls of the cage, having upon their inner surface circular grooves 2, in which are removably and interchangeably located a series of grate bar spacing seats 3.

The numeral 4 indicates the grate bars, which are of the usual construction, preferably made of tool steel wedge shaped in cross section, to permit the material to readily clear as it is being discharged through the spaces between said bars. Said grate bar seats 3 are preferably in the form of segmental steel castings, having formed in their upper and inner sides tapered recesses in which the tapered opposite sides of said grate bars are detachably mounted, the outer sides of said grate bar seats being closed while the upper and inner sides are open, and a series of said seats 3 are located in the opposite segmental grooves 2 of the opposite cage walls, with corresponding grate bars 4 located in said seats, thereby properly spacing the grate bars and holding them securely in such spaced position during operation. The top of the seats 3 being open, the grate bars may be readily dropped into and removed from said seats without disturbing the position of the said seats.

In Figs. 1 and 2 I have shown the bars spaced comparatively near each other, while in Figs. 5 and 6 I have shown the grate bars spaced farther apart. The graduation in spacing is accomplished by using bar seats 3 having abutting side walls 5 of various thicknesses, corresponding to the space desired between the grate bars. The side-walls 5 of the seats 3 are connected and closed by an outer integral wall, for the purpose of strengthening the device and also to keep the seat from sliding inwardly upon its grate-bar 4.

It will be observed that the abutting side walls 5 in the construction shown in Figs. 5 and 6 is considerably thicker than that shown in Figs. 1 and 2, thereby spacing the grate bars 4 farther apart.

The operation of my invention is obvious, and need not be further described.

I claim:

The improved seat for pulverizer grate-bars, comprising the combination with a series of grate-bars, of a separate L-shaped seat-block for each end of each bar, said block having an upwardly-open V-shaped bar-bearing which extends from the top to the bottom of said block and leaves an opening at both top and bottom thereof, so that the bar may be dropped into and removed from its bearings from a point above, the end-walls of said block at the outer end of said V-shaped bearing being connected by an integral part which closes said outer end of said bearing.

In testimony whereof, I have signed my name to this specification, in presence of two subscribing witnesses.

HENRY J. SHELTON.

Witnesses:
E. L. WALLACE,
E. M. HARRINGTON.